United States Patent
Singh et al.

(10) Patent No.: US 12,437,528 B2
(45) Date of Patent: Oct. 7, 2025

(54) TRAINING A SPEAKER NEURAL NETWORK USING ONE OR MORE LISTENER NEURAL NETWORKS

(71) Applicant: DeepMind Technologies Limited, London (GB)

(72) Inventors: Aaditya K. Singh, McLean, VA (US); Fengning Ding, London (GB); Felix George Hill, London (GB); Andrew Kyle Lampinen, Palo Alto, CA (US)

(73) Assignee: DeepMind Technologies Limited, London (GB)

( * ) Notice: Subject to any disclaimer, the term of this patent is extended or adjusted under 35 U.S.C. 154(b) by 332 days.

(21) Appl. No.: 18/199,896

(22) Filed: May 19, 2023

(65) Prior Publication Data
US 2023/0401835 A1    Dec. 14, 2023

Related U.S. Application Data

(60) Provisional application No. 63/343,960, filed on May 19, 2022.

(51) Int. Cl.
*G06V 10/82*    (2022.01)
*G06V 20/62*    (2022.01)

(52) U.S. Cl.
CPC ............ *G06V 10/82* (2022.01); *G06V 20/635* (2022.01)

(58) Field of Classification Search
CPC ........ G06V 10/82; G06V 20/62; G06V 20/63; G06V 20/635; G06V 20/70; G06V 10/86; G06V 10/25; G06V 10/26
See application file for complete search history.

(56) References Cited

U.S. PATENT DOCUMENTS

| | | | | |
|---|---|---|---|---|
| 10,460,033 B2* | 10/2019 | Cohen | ............... | G06N 3/042 |
| 10,467,274 B1* | 11/2019 | Ren | ............... | G06N 3/006 |
| 10,496,884 B1* | 12/2019 | Nguyen | ............... | G06V 30/413 |
| 12,167,100 B2* | 12/2024 | Lin | ............... | G06N 3/044 |
| 12,210,825 B2* | 1/2025 | Cho | ............... | G06F 40/253 |
| 2018/0268297 A1* | 9/2018 | Okazaki | ............... | G06N 3/088 |
| 2021/0326660 A1* | 10/2021 | Krishnan | ............... | G06F 18/214 |
| 2023/0019211 A1* | 1/2023 | Wang | ............... | G06N 3/0464 |
| 2023/0401877 A1* | 12/2023 | Srinivasa | ............... | G06V 30/1448 |

FOREIGN PATENT DOCUMENTS

| | | | | |
|---|---|---|---|---|
| EP | 3889836 A1 * | 10/2021 | ......... | G06F 18/2132 |
| WO | WO-2020190112 A1 * | 9/2020 | ......... | G06F 18/2431 |

OTHER PUBLICATIONS

Yun et al, "Gated Object-Attribute Matching Network for Detailed Image Caption" (pp. 1-11). (Year: 2020).*
He et al., "A Modularized Architecture of Multi-Branch Convolutional Neural Network for Image Captioning" (pp. 1-15) (Year: 2019).*
Agarwal et al., "Evaluating CLIP: towards characterization of broader capabilities and downstream implications," CoRR, Aug. 5, 2021, arxiv.org/abs/2108.02818, 5 pages.

(Continued)

*Primary Examiner* — Manav Seth
(74) *Attorney, Agent, or Firm* — Fish & Richardson P.C.

(57) ABSTRACT

Methods, systems, and apparatus, including computer programs encoded on computer storage media, for training a speaker neural network using one or more listener neural networks.

22 Claims, 4 Drawing Sheets

(56) References Cited

OTHER PUBLICATIONS

Alayrac et al., "Flamingo: a visual language model for few-shot learning," CoRR, Apr. 29, 2022, arxiv.org/abs/2204.14198, 54 pages.
Baumli et al., "Relative variational intrinsic control," CoRR, Dec. 14, 2020, arxiv.org/abs/2012.07827, 9 pages.
Brock et al., "High-performance large scale image recognition without normalization," CoRR, Feb. 11, 2021, arxiv.org/abs/2102.06171, 22 pages.
Brown et al., "Language models are few-shot learners," CoRR, Jul. 22, 2020, 75 pages.
Burns et al., "Women also Snowboard: Overcoming Bias in Captioning Models," CoRR, Mar. 26, 2018, arXiv:1803.09797, 22 pages.
Clark et al., "Referring as a collaborative process," Cognition, 22, 1986, 387(1):1-39.
Cogswell et al., "Dialog without dialog data: Learning visual dialog agents from VQA data," CoRR, Jul. 24, 2020, Jul. 24, 2020, 19 pages.
Elhagry et al., "A thorough review on recent deep learning methodologies for image captioning," CoRR, Jul. 28, 2021, arxiv.org/abs/2107.13114, 6 pages.
Github.com [online], "Haiku: SONNET for JAX," Sep. 2023, retrieved on Nov. 22, 2023, retrieved from URL<https://github.com/google/jax/>, 11 pages.
Github.com [online], "JAX: Autograd and XLA," Nov. 2018, retrieved on Nov. 22, 2023, retrieved from URL<https://github.com/google/jax/>, 11 pages.
Hawkins et al., "From partners to populations: A hierarchical bayesian account of coordination and convention," Psychological Review, 2022, 130(4):977-1016.
Hawkins et al., "The emergence of social norms and conventions," Trends in cognitive sciences, Feb. 2019, 23(2):158-169.
Hoffmann et al., "Training compute-optimal large language models," CoRR, Mar. 29, 2022, arxiv.org/abs/2203.15556, 36 pages.
Holtzman et al., "The curious case of neural text degeneration," CoRR, Apr. 22, 2019, arxiv.org/abs/1904.09751, 16 pages.
Hu et al., "Lora: Low-rank adaptation of large language models," CoRR, Jun. 17, 2021, arxiv.org/abs/2106.09685, 26 pages.
Jaderberg et al., Human-level performance in 3D multiplayer games with population-based reinforcement learning, Science, May 31, 2019, 364(6443):859-865.
Jaegle et al., "Perceiver IO: A general architecture for structured inputs & outputs," CoRR, Jul. 30, 2021, arxiv.org/abs/2107.14795, 29 pages.
Jia et al., "Scaling up visual and vision-language representation learning with noisy text supervision," CoRR, Feb. 11, 2021, arxiv.org/abs/2102.05918, 14 pages.
Keys, "Cubic convolution interpolation for digital image processing," IEEE Transactions on Acoustics, Speech, and Signal Processing, Dec. 1981, 29(6):1153-1160.
Kingma et al., "Adam: A method for stochastic optimization," CoRR, Dec. 22, 2014, arxiv.org/abs/1412.6980, 15 pages.
Kudo et al., "Sentencepiece: A simple and language independent subword tokenizer and detokenizer for neural text processing," CoRR, Aug. 19, 2018, arxiv.org/abs/1808.06226, 6 pages.
Kunda et al., "Creative captioning: An AI grand challenge based on the dixit board game," CoRR, Sep. 30, 2020, arxiv.org/abs/2010.00048, 9 pages.
Lazaridou et al., "Multi-agent communication meets natural language: Synergies between functional and structural language learning," CoRR, May 14, 2020, arxiv.org/abs/2005.07064, 11 pages.
Lee et al., "Countering language drift via visual grounding," CoRR, Sep. 10, 2019, arXiv:1909.04499, 11 pages.
Li et al., "Prefix-Tuning: Optimizing continuous prompts for generation," CoRR, Jan. 1, 2021, arxiv.org/abs/2101.00190, 15 pages.
Lin et al., "Microsoft COCO: common objects in context," CoRR, May 1, 2014, arxiv.org/abs/1405.0312, 15 pages.
Meade et al., "An empirical survey of the effectiveness of debiasing techniques for pre-trained language models," CoRR, Oct. 16, 2021, arxiv.org/abs/2110.08527, 21 pages.
Mokady et al., "Clipcap: CLIP prefix for image captioning," CoRR, Nov. 18, 2021, arxiv.org/abs/2111.09734, 10 pages.
Ouyang et al., "Training language models to follow instructions with human feedback," CoRR, Mar. 4, 2022, arXiv:2203.02155, 68 pages.
Perez et al., "Red teaming language models with language models," CoRR, Feb. 7, 2022, arxiv.org/abs/2202.03286, 31 pages.
Purwins et al., "Deep learning for audio signal processing," CoRR, Apr. 30, 2019, arxiv.org/abs/1905.00078, 15 pages.
Radford et al., "Learning transferable visual models from natural language supervision," CoRR, 2021, arxiv.org/abs/2103.00020, 48 pages.
Rajbhandari et al., "ZeRO; Memory optimizations toward training trillion parameter models," CoRR, Oct. 4, 2019, arxiv.org/abs/1910.02054, 24 pages.
Schick et al., "Self-Diagnosis and Self-Debiasing: A Proposal for Reducing Corpus-Based Bias in NLP," Transactions of the Association for Computational Linguistics, Dec. 17, 2021, 9:1408-1424.
Sharma et al., "Conceptual captions: A cleaned, hypernymed, image alt-text dataset for automatic image captioning," Proceedings of the 56th Annual Meeting of the Association for Computational Linguistics (vol. 1: Long Papers), Jul. 2018, pp. 2556-2565.
Stiennon et al., "Learning to summarize with human feedback," Advances in Neural Information Processing Systems, 2020, 33:3008-3021.
Tsimpoukelli et al., "Multimodal few-shot learning with frozen language models," CoRR, Jun. 25, 2021, arxiv.org/abs/2106.13884, 19 pages.
Vaswani et al., "Attention is all you need," CoRR, Dec. 6, 2017, arxiv.org/abs/1706.03762, 15 pages.
Vélez et al., "The rare preference effect: Statistical information influences social affiliation judgments," Cognition, Nov. 2019, 192:103994.
Wang et al., "Learning to represent student knowledge on programming exercises using deep learning," International Educational Data Mining Society, Jun. 25-28, 2017, pp. 324-329.
Weidinger et al., "Ethical and social risks of harm from language models," CoRR, Dec. 8, 2021, arxiv.org/abs/2112.04359, 64 pages.
Williams et al., "A learning algorithm for continually running fully recurrent neural networks," Neural Computation, Jun. 1, 1989, 1(2):270-280.
Williams et al., "Simple statistical gradient-following algorithms for connectionist reinforcement learning," Mach. Learn., May 1992, 8(3-4):229-256.
Xiao et al., "Fashion-MNIST: a novel image dataset for benchmarking machine learning algorithms," CoRR, Aug. 25, 2017, arxiv.org/abs/1708.07747, 6 pages.
Yoon et al., "Talking with tact: Polite language as a balance between kindness and informativity," Proceedings of the 38th Annual Conference of the Cognitive Science Society, 2016, pp. 2771-2776.
Ziegler et al., "Fine-tuning language models from human preferences," CoRR, Sep. 18, 2019, arxiv.org/abs/1909.08593, 26 pages.

\* cited by examiner

TRAINING A SPEAKER NEURAL NETWORK USING ONE OR MORE LISTENER NEURAL NETWORKS

CROSS-REFERENCE TO RELATED APPLICATION

This application claims priority to U.S. Provisional Application No. 63/343,960, filed on May 19, 2022. The disclosure of the prior application is considered part of and is incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers that that trains a speaker neural network.

The speaker neural network is a neural network that processes an image to generate a text caption for the image.

In particular, during the training, the system uses one or more listener neural networks to adapt the text captions generated by the speaker neural network, e.g., to adapt the captions to refer to only some characteristics of images, to avoid referring to one or more characteristics of images, or both. For example, the system can adapt the speaker neural network to avoid referring to colors that are present in images, to avoid referring to certain portions of the image, or to describe images based only on the color of various portions of the image instead of any other details of the object(s) depicted in the image.

Particular embodiments of the subject matter described in this specification can be implemented so as to realize one or more of the following advantages.

This specification describes techniques for adapting a speaker neural network that generates image captions. By using the described techniques, the system can train the speaker neural network to generate captions that have a desired characteristic without requiring labeled data of captions that have the characteristics. In particular, by rewarding the speaker based on whether the training image from which a given caption was generated was accurately distinguished from a set of distractor images in a set of listener inputs, the system can effectively train the speaker to generate captions that have the desired characteristic. For example, the system can fine-tune an existing image captioning neural network using the described techniques to adapt the image captioning neural network for deployment in new settings where certain types or styles of captions are required, e.g., captions that do not reference color or captions that are tailored to the preferences of a certain group of users.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
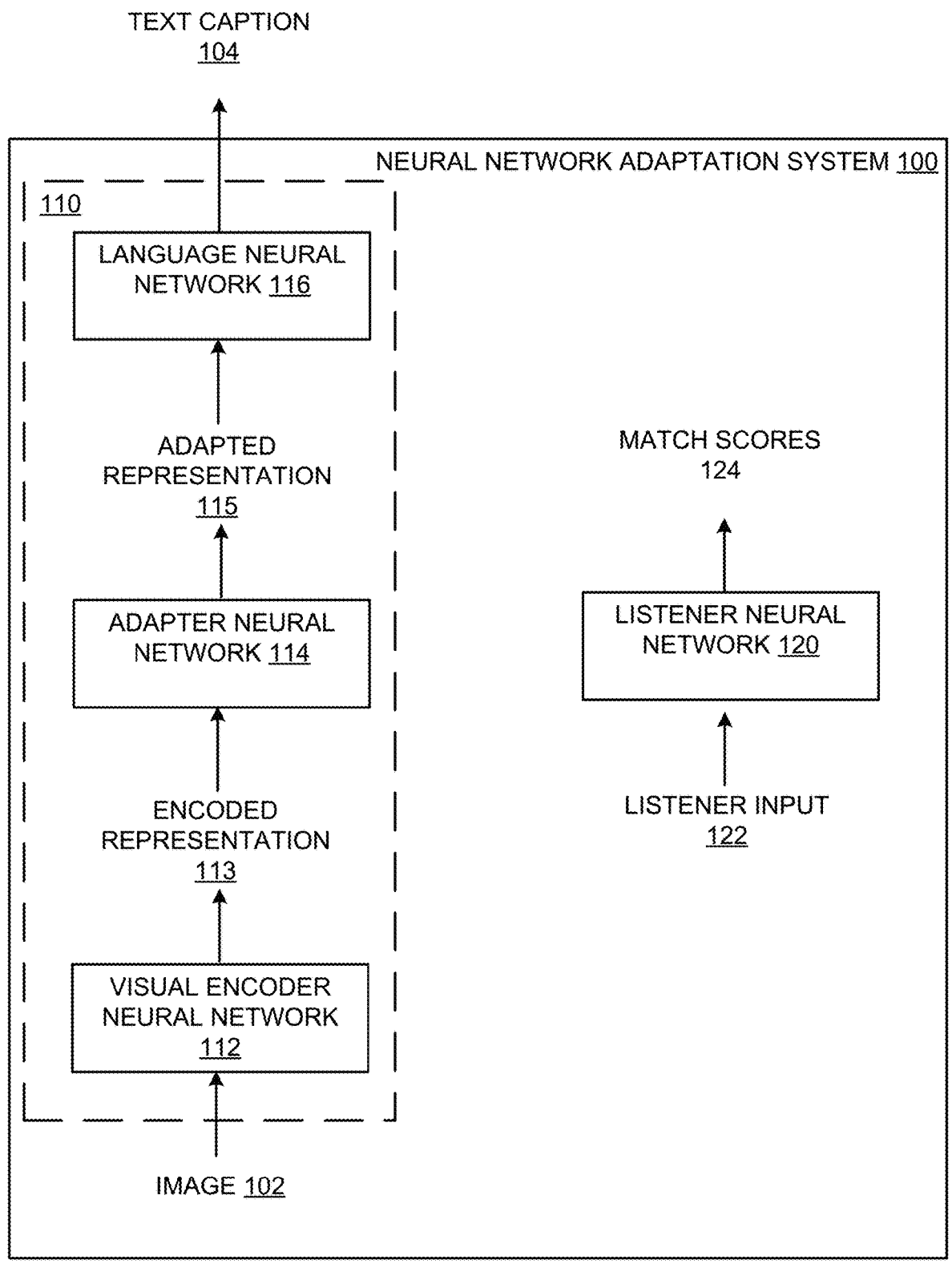
FIG. 1 shows an example neural network adaptation system.

FIG. 1 shows an example neural network adaptation system 100. The neural network adaptation system 100 is an example of a system implemented as computer programs on one or more computers in one or more locations, in which the systems, components, and techniques described below can be implemented.

The system 100 trains a speaker neural network 110 to perform image captioning.

In particular, the speaker neural network 110 is a neural network that processes an image 102 to generate a text caption 104 for the image 102. The text caption 104 is a sequence of text tokens, e.g., words, sub-words, characters, or other text symbols, that describes the image 102, e.g., that describes the semantic content of the image 102.

For example, the speaker neural network 110 can include a vision encoder neural network 112, an adapter neural network 114, and a language neural network 116.

The vision encoder neural network 112 is configured to process the image 102 to generate an encoded representation 113. The encoded representation 113 of the image 102 can be, e.g., a sequence of feature vectors or a spatial grid of feature vectors, with each feature vector corresponding to a respective portion of the image 102.

The adapter neural network 114 is configured to process the encoded representation 113 to generate an adapted representation 115 of the image 102.

The adapted representation 115 also includes a set of feature vectors, e.g., the same number of feature vectors or a different number of feature vectors from the encoded representation 113, but is generally different from the encoded representation 113.

The language neural network 116 is configured to process the adapted representation 115 to generate the text caption 104 of the image 102.

Thus, by processing the image 102 through the vision encoder neural network 112, the adapter neural network 114, and the language neural network 116, the speaker neural network 110 generates a text caption 104 that describes the image 102.

Example architectures for the vision encoder neural network 112, the adapter neural network 114, and the language neural network 116 are described in more detail below with reference to FIG. 3.

In some implementations, the system 100 trains the vision encoder 112, the adapter 114, and the language neural networks 116 from scratch. That is, the system 100 initializes the parameters of the vision encoder 112, the adapter 114, and the language neural networks 116 using an initialization technique and then trains the vision encoder 112, the adapter 114, and the language neural networks 116 starting from the initialized parameter values.

In some other implementations, some or all of these components can be pre-trained on a different task. In some of these implementations, the pre-trained components are then held fixed during the training performed by the system.

For example, the adapter neural network 114 can be trained by the system 100 while the vision encoder 112 and the language neural networks 116 are held fixed. Holding a neural network "fixed" refers to holding the values of the parameters of the neural network fixed and not updating the values during training.

As a particular example, the vision encoder 112 can have been pre-trained through unsupervised learning, e.g., through a contrastive learning objective, while the language neural network 116 can have been pre-trained on a language modeling objective that require predicting a next text token given a current sequence of text tokens.

To train the speaker neural network 110, the system 100 obtains a training set 150 of images ("training images") and uses the training set 150 and a set of one or more listener neural networks 120 to train the speaker neural network 110.

Each listener neural network 120 is configured to process a listener input 122 that includes a text caption and a set of images to generate a respective match score 124 for each image in the set. For example, the match score for a given image can represent the degree to which the text caption matches the image.

As a particular example, each listener network 120 can include a visual encoder neural network that generates an embedding of each image in the set of images and a text encoder neural network that generates an embedding of the text caption.

The match score for a given image can then be computed based on a similarity, e.g., cosine similarity, between the embedding of the given image and the embedding of the text caption.

Generally, each listener neural network 120 is pre-trained and is not trained by the system 100 as part of the training of the speaker neural network 110. For example, as will be described in more detail below, each listener neural network 120 can have been pre-trained on an unsupervised objective that encourages text sequences and images that have similar semantic content to have embeddings that are close to one another in the embedding space.

An example objective for the pre-training is described below with reference to FIG. 2.

Generally, the system 100 uses the listener neural network(s) 120 to adapt the characteristics of images that are described in the text captions generated by the speaker neural network 110 by training the speaker neural network 110 using rewards that are generated based on match scores generated by the listener neural network(s) 120.

Using the listener neural network(s) 120 to train the speaker neural network 110 is described in more detail below with reference to FIGS. 2 and 3.

After the speaker neural network 110 has been trained and the captions that are generated by the speaker neural network 110 have been adapted, the system 100 or another inference system 150 can use the speaker neural network 110 to generate captions of new images, e.g., by processing each new image using the trained speaker neural network 110 to generate a text caption of the new image.

Figure 2:
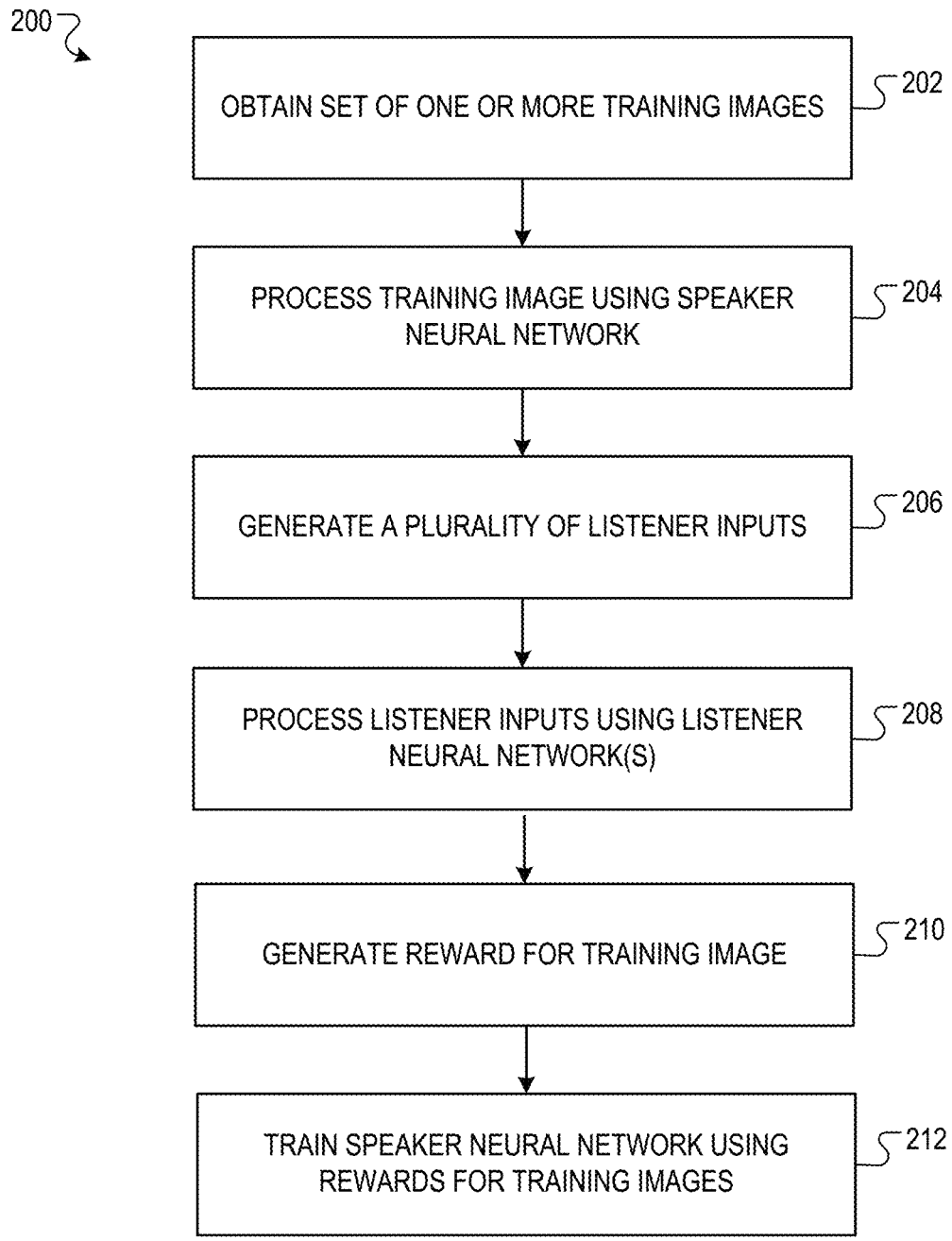
FIG. 2 is a flow diagram of an example process for training the speaker neural network.

FIG. 2 is a flow diagram of an example process 200 for training the speaker neural network. For convenience, the process 200 will be described as being performed by a system of one or more computers located in one or more locations. For example, a neural network adaptation system, e.g., the neural network adaptation system 100 of FIG. 1, appropriately programmed, can perform the process 200.

The system can repeatedly perform iterations of the process 200 on different batches ("sets") of one or more training images to update the parameters of the speaker neural network.

As described above, in some cases the system only updates a portion of the parameters of the speaker neural network. For example, when the speaker neural network includes a visual encoder, an adapter neural network, and a language neural network, the system can update the parameters of the adapter neural network while holding the visual encoder and the language neural networks fixed.

That is, at each iteration of the process 200, the system obtains a batch of one or more training images, e.g., by sampling the batch from a larger set of training data, and uses the batch of one or more training images to update the parameters of (at least some) of the parameters of the speaker neural network.

The system can continue performing iterations of the process 200 until termination criteria for the training of the neural network have been satisfied, e.g., until the parameters have converged, until a threshold amount of wall clock time has elapsed, or until a threshold number of iterations of the process 200 have been performed.

The system obtains a set of one or more training images, e.g., a set of one or more training images that has been sampled from a larger training set of images (step 202).

The system then performs steps 204-210 for each training image in the set.

The system processes the training image using the speaker neural network to generate a text caption for the training image (step 204).

The system generates a plurality of listener inputs (step 206).

Each listener input generally includes (i) the text caption for the training image and (ii) a respective set of images.

Each set of images includes a corresponding version of the training image and a corresponding set of one or more distractor images that are each different from the training image. For example, the system can sample distractor images randomly from a set of images that does not include the training image, e.g., from the remaining training images in the set of training images obtained at step 202 or from the larger training set. In some cases, the distractor images are the same across all of the listener inputs while in others they can be different.

For each listener input, the system processes the listener input using a respective listener neural network from the set of one or more listener neural networks to generate a respective match score for each image in the respective set of images in the listener input (step 208).

That is, each listener input is processed using a corresponding listener neural network. Each listener neural network is configured to process the text caption and the set of images to generate a respective match score for each image.

For example, each listener network can include a visual encoder that generates an embedding of each image and a text encoder that generates an embedding of the text caption. The match score for a given image can then be computed based on a similarity, e.g., cosine similarity, between the embedding of the given image and the embedding of the text caption. Generally, the listener networks are pre-trained and are not trained as part of the described training.

In some cases, the set includes only a single listener neural network. In these cases, each listener input includes a different corresponding version of the training image. In particular, in these cases, for a first listener input of the plurality of listener inputs, the corresponding version of the training image is the training image, i.e., without any transformations applied.

Additionally, for at least one of the listener inputs of the plurality of listener inputs, the corresponding version of the training image is the training image after a corresponding image transformation has been applied to the training image.

The transformation can be any appropriate transformation that changes the appearance of the training image.

As one example, the transformation can be one changes one or more color values in the training image. For example, the transformation can transform the original image from color to grayscale. As another example, the transformation can transform the original image to a version of the image that reflects how the image would be perceived by a person that has a certain type of color blindness.

As another example, the transformation can be a transformation that crops a portion of the training image, e.g., that crops the top left, top right, bottom left, or bottom right of the image.

As another example, the transformation can be a transformation that rotates at least a portion of the training image.

As yet another example, the transformation can be one that blurs at least a portion of the training image.

Generally, when a given listener input includes a transformed version of the training image, the same transformation is also applied to the distractor images in the given listener input.

In some other cases, the set includes multiple listener neural networks, e.g., that have been pre-trained differently from each other, e.g., on different training data, using a different training algorithm, from differently initialized parameter values, and so on. In these cases, the listener inputs can all include the same version of the training image (e.g., the original training image).

The system then generates a reward for the training image based at least in part on the respective match scores for the training image generated by processing each of the listener inputs (step 210).

Generally, for a given training image, the system can generate a respective accuracy score for each listener input based on whether the training image was assigned the highest match score of any image in the respective set of images in the listener input and combine the respective accuracy scores to generate the reward. That is, the accuracy score is based on whether the image in the set of images that was assigned the highest match score is the training image.

For example, the accuracy scores can be binary accuracy scores that are equal to one value, e.g., one, if the training image is assigned the highest match score and equal to another, smaller value, e.g., zero or negative one, if the training image is not assigned the highest match score.

Depending on how the rewards are generated from the accuracy scores, the system can train the speaker neural network to generate captions that have a desired characteristic. In other words, the system can train the speaker neural network to generate captions that have a desired characteristic by appropriately computing the reward from the accuracy scores.

For example, the objective of the training can be to cause the speaker to generate captions that are only recognizable when paired with a certain subset of the versions of the training images. This can cause the speaker to generate captions that only refer to images by characteristics that are visible in the training image provided in the subset of the versions of the training image.

In these cases, for each training image, the system can determine whether only a designated subset of the listener inputs resulted in a highest match score of any image in the respective set of images being assigned to the listener input to the training image, e.g., only a designated subset of the listener inputs resulted in an accuracy score of one. That is, the system can determine whether only the subset of listener inputs that included the certain subset of the versions of the training image resulted in the highest match score of any image in the respective set of images being assigned to the listener input to the training image.

The system can then assign a maximum reward, e.g., one, for the training image only in response to determining that only the designated subset of the listener inputs assigned a highest match score of any image in the respective set of images in the listener input to the training image. Otherwise, the system can assign a minimum reward, e.g., zero or negative one, to the training image.

Thus, by configuring how the training image versions are generated (e.g., which transformations are applied to the training image) and which listener inputs are in the designated subset, the system can train the speaker to generate captions that reference the content of the input in a particular way.

As particular examples, when there are multiple listener inputs, the system can compute the reward to cause the speaker neural network to generate captions that do not reference any color, that do not reference anything that is depicted in a particular portion of the image, or that reference only colors depicted in the image without identifying any objects depicted in the image.

As another example, the objective of the training can be to cause the speaker to generate captions that are recognizable from all of the versions of the training image. In these examples, the system can generate the reward as the sum of the accuracy scores. In these examples, the system can train the speaker to generate captions that reference the content of the input in a way that is descriptive of the image even under a set of transformations (the transformations that are applied to generate the corresponding versions), e.g., by not referencing any color when one of the listener inputs includes greyscale versions of the images.

As another example, when the set of listener neural networks includes multiple different listener neural networks, the objective of the training can be to train the speaker neural network and then to use the speaker neural network to determine whether a designated one of the listener neural networks are biased. That is, the system can generate the rewards by assigning a maximum reward for the training image only in response to determining that only a designated subset of the listener inputs (that are provided to a designated subset of the listener networks) assigned a highest match score of any image in the respective set of images in the listener input to the training image.

In this example, after training, the system can use the speaker neural network to measure the bias of the listener neural network. In particular, the system can measure the bias of the speaker neural network e.g., using a technique such as the one described in Women also Snowboard: Overcoming Bias in Captioning Models, arXiv:1803.09797. If the speaker neural network has a measured bias, the system can determine that one of the listener neural networks in the designated subset is biased.

The system trains the speaker neural network using the rewards for the training images (step 212).

In particular, the system trains the speaker neural network using the rewards through reinforcement learning, e.g., to maximize the expected reward received for any given training image.

Generally, the system can train the speaker neural network using any appropriate reinforcement learning technique. As a particular example, the system can train the speaker neural network using a policy gradient reinforcement learning technique. One example of such a technique that can be used by the system is REINFORCE.

By repeatedly training the speaker neural network to maximize expected rewards by performing iterations of the process 200, the system trains the speaker neural network to have the characteristics described above, i.e., to generate captions that receive high rewards, and as a result, describe images in the way that is encouraged by the reward function.

Figure 3:
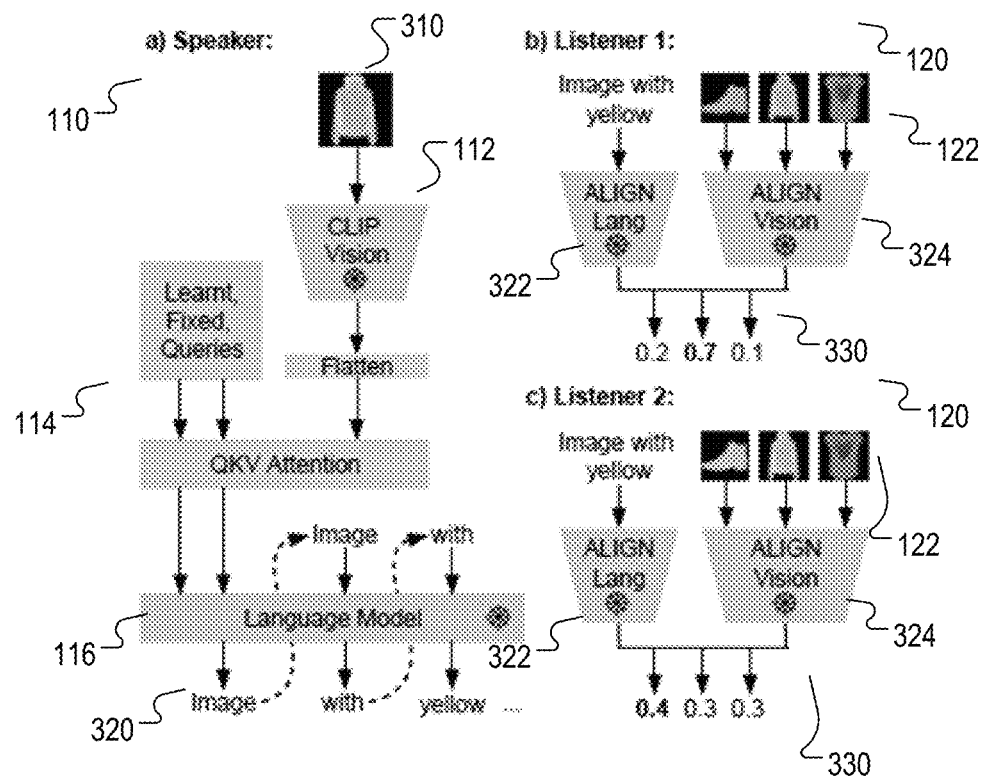
FIG. 3 shows the operation of the adaptation system during the training of the speaker neural network.

FIG. 3 shows an example of the operation of the adaptation system 100 during the training of the speaker neural network 110.

More specifically, FIG. 3 shows an example of the operation of the system 100 during the processing of a training image 310 as part of the training of the speaker neural network 110.

In the example of FIG. 3, the adaptation system 100 includes the speaker neural network 110 and one listener neural network 120.

More specifically, as shown in FIG. 3, the speaker neural network 110 includes the visual encoder neural network 112, the adapter neural network 114, and the language neural network 116.

In the example of FIG. 3, the adapter neural network 114 is configured to process the encoded representation of the training image 310 generated by the visual encoder neural network 112 to generate an adapted representation of the training image 310 by applying one or more QKV-attention layers over the encoded representation to generate the adapted representation, where QKV represents Query Key Value (QKV) attention.

More specifically, the adapter neural network 114 maintains a set of learned queries. Rather than being input-dependent, these queries are learned jointly during the training of the adapter neural network 114.

The adapter neural network 114 then uses a set of parameters to map the encoded representation to a set of keys and a set of values. For example, the adapter neural network 114 can flatten the encoded representation into a sequence of feature vectors and then apply (i) a key weight matrix to the sequence of feature vectors to generate a set of keys and (ii) a value weight matrix to the sequence of feature vectors to generate a set of values.

The adapter neural network 114 then applies an attention mechanism, i.e., QKV attention, over the queries, keys, and values to generate the adapted representation of a given training image.

Optionally, the adapter neural network 114 can then apply one or more additional transformations to the output of the QKV attention mechanism as part of generating the adapted representation. For example, the adapter neural network 114 can include any of: additional QKV attention mechanisms, position-wise feedforward layers, layer normalization operations, residual connections, and so on.

While FIG. 3 shows the adapter neural network 114 having an attention-based architecture, more generally, the adapter neural network 114 can have any appropriate architecture that transforms the encoded representation in accordance with a set of parameters to generate an adapted representation. For example, the adapter neural network 114 can have a convolutional architecture or a recurrent architecture.

As shown in FIG. 3, the system 100 processes the adapted representation of the training image 310 using the language neural network ("language model") 116 to generate a caption 320 of the training image 310.

As shown in FIG. 3, the language neural network 116 is an auto-regressive neural network, e.g., a Transformer neural network or a recurrent neural network, that generates each token in the caption 320 conditioned on each preceding token in the caption 320. In this example, the system 100 can condition the language neural network 116 on the adapted representation by providing the feature vectors in the adapted representation as a prefix to the language neural network 116, i.e., as the first n tokens of the input sequence that is processed by the language neural network 116.

In the example of FIG. 3, the set of listener neural networks 120 one listener neural network 120 that receives two different listener inputs 122 that each include (i) the text caption 320 for the training image 310 and (ii) a respective set of images, wherein the respective set of images includes a corresponding version of the training image 310 and a corresponding set of one or more distractor images that are each different from the training image. In the example of FIG. 3, the set of images includes a version of the training image 310 and two distractor images. Additionally, in the example of FIG. 3, one listener input 122 includes the original training image 310 while the other listener input 122 includes a grayscale version of the original training image 310.

Each listener neural network 120 processes the corresponding listener input 122 to generate a respective match score 330 for each image in the respective set of images in the corresponding listener input 122.

As shown in FIG. 3, each listener neural network 120 includes a respective visual encoder 322 that processes an input image to generate an embedding of the input image and a respective text encoder 324 that processes the text sequence to generate an embedding of the text sequence in the same embedding space as the embedding of the input image.

For example, the visual encoder 322 can be a vision Transformer or a convolutional neural network and the text encoder 324 can be a Transformer or a recurrent neural network (RNN).

As described above, the listener neural networks 120 have been pre-trained and are not trained by the system 100 as part of the training of the speaker neural network 110. When the listener neural network(s) 120 each include a visual encoder 322 and a text encoder 324, the visual encoder and the text encoder can have been jointly trained through self-supervised learning, e.g., through contrastive learning or other representation learning technique that encourages embeddings of semantically similar images and text sequences to be close to one another in the embedding space.

Pre-training the listener neural network(s) 120 and then holding the listeners frozen during the training of the speaker neural network 110 can prevent co-adaptation, pragmatic drift, or both from occurring during the training.

In the example of FIG. 3, to generate the match scores 330, the listener neural network 120 can process each image in a given listener input 122 using the visual encoder 322 to generate a respective embedding of each image in the set and process the caption 320 using the text encoder 324 to generate an embedding of the caption 320. The neural network 120 can then compute a respective similarity score for each image by computing, e.g., a dot product or cosine similarity, between the embedding of the image and the embedding of the caption 320. The system can then use the similarity scores as the match scores 330 or normalize the similarity scores 330 to generate the match score 330.

Thus, after processing each listener input 122, the listener neural network 120 has generated a respective set of match scores 330 for each listener input 122.

As described above, the system 100 can then generate a reward for the training image 310 using the sets of match scores 330 and then train the speaker neural network 110 on the rewards generated for the training images in the current batch.

Figure 4:
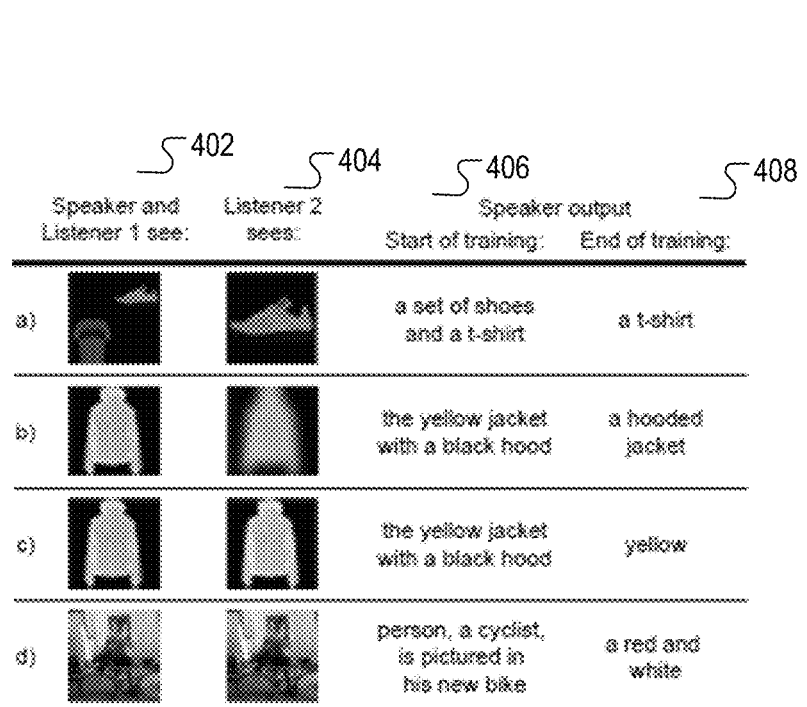
FIG. 4 shows a table of examples of the effects of the adaptation of the speaker neural network.

FIG. 4 shows a table 400 of examples of the effects of the adaptation of the speaker neural network 110. In particular, FIG. 4 shows example results of the adaptation in an example where, like the example 300, there is a single listener neural network 120 that receives two different listener inputs: the first includes the original versions of the training images and the second includes transformed versions of the training images (and of the distractor images).

Each row a-d of the example table 400 shows the results of a different adaptation scheme. In particular, in each row of the table 400, the speaker neural network 110 is trained on a different data set and the second listener input includes respective transformed version of the training images.

In particular, in row a) the second listener neural network 120 receives a top-right crop of the training image, in row b) the second listener input includes a blurred version of the training image, and in rows c) and d) the second listener input includes a grayscale version of the training image.

Column 402 shows the original version of a training image that would be provided to the speaker 110 and as part of the first listener input.

Column 404 shows the transformed version of a training image that would be provided as part of the second listener input.

Column 406 shows the text caption generated by the speaker 110 for the training image at the beginning of the training performed by the system 100, while column 408 shows the text caption generated by the speaker 110 for the same training image after the completion of the training performed by the system 100.

As can be seen from FIG. 4, the captions are significantly different after the training has been completed.

For example, in row a) the speaker neural network describes a property of the image that is not in the cropped portion of the image that is provided by the listener.

In row b), the speaker neural network describes only properties of the image that are hard to discern in the blurred version of the image, i.e., does not refer to the color of the image.

In rows c) and d), the speaker neural network describes only the color of the objects in the image, which is not visible in the greyscale version of the image.

Thus, in each example, the system successfully adapts the operation of the speaker neural network 110 to only describe images by specified characteristics of the images.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining a set of one or more training images;
for each training image in the set:
processing the training image using a speaker neural network to generate a text caption for the training image;
generating a plurality of listener inputs, each listener input comprising (i) the text caption for the training image and (ii) a respective set of images, wherein the respective set of images includes a corresponding version of the training image and a corresponding set of one or more distractor images that are each different from the training image;
for each listener input, processing the listener input using a respective listener neural network from a set of one or more listener neural networks to generate a respective match score for each image in the respective set of images in the listener input; and
generating a reward for the training image based at least in part on the respective match scores for the training image generated by processing each of the listener inputs; and
training the speaker neural network using the rewards for the training images.

2. The method of claim 1, wherein the speaker neural network comprises:
a vision encoder neural network configured to process the training image to generate an encoded representation of the training image;
an adapter neural network configured to process the encoded representation to generate an adapted representation of the training image; and
a language neural network configured to process the adapted representation to generate the text caption of the training image.

3. The method of claim 2, wherein the adapter neural network is configured to apply one or more QKV-attention layers over the encoded representation to generate the adapted representation.

4. The method of claim 2, wherein training the speaker neural network using the rewards for the training images comprises:
updating the adapter neural network while holding the vision encoder neural network and the language neural network fixed.

5. The method of claim 4, further comprising, prior to the training:
pre-training the speaker neural network on an image captioning data set through supervised learning to pre-train the adapter neural network while holding the vision encoder neural network and the language neural network fixed.

6. The method of claim 4, wherein the language neural network has been pre-trained on one or more language modeling tasks.

7. The method of claim 4, wherein the vision encoder neural network has been pre-trained on one or more representation learning tasks.

8. The method of claim 1, wherein the corresponding set of distractor images is the same set of distractor images for all of the listener inputs.

9. The method of claim 1, wherein generating a reward for the training image based at least in part on the respective match scores for the training image generated by processing each of the listener inputs comprises:
generating a respective accuracy score for each listener input based on whether the training image was assigned a highest match score of any image in the respective set of images in the listener input; and
combining the respective accuracy scores to generate the reward.

10. The method of claim 1, wherein generating a reward for the training image based at least in part on the respective match scores for the training image generated by processing each of the listener inputs comprises:
determining whether only a designated subset of the listener inputs assigned a highest match score of any image in the respective set of images in the listener input to the training image; and
assigning a maximum reward for the training image only in response to determining that only the designated subset of the listener inputs assigned a highest match score of any image in the respective set of images in the listener input to the training image.

11. The method of claim 1, wherein the set of one or more listener neural networks includes only one listener neural network.

12. The method of claim 1, wherein the set of one or more listener neural networks includes a plurality of different listener neural networks, wherein each listener input is processed by a different one of the different listener neural networks, and wherein the corresponding version of the training image in each of the training inputs is the same for all of the training inputs.

13. The method of claim 12, wherein one of the different listener neural networks has been trained on training data that reflects preferences of a particular user.

14. The method of claim 12, further comprising:
after the training, determining, based on test text captions generated by the speaker neural network by processing test images, a level of bias exhibited by one or more of the plurality of different listener neural networks.

15. The method of claim 1, wherein, for a first listener input of the plurality of listener inputs, the corresponding version of the training image is the training image.

16. The method of claim 1, wherein, for at least one of the listener inputs of the plurality of listener inputs, the corresponding version of the training image is the training image after a corresponding image transformation has been applied to the training image.

17. The method of claim 16, wherein the corresponding image transformation comprises one or more of:
a transformation that changes one or more color values in the training image;
a transformation that crops a portion of the training image;
a transformation that rotates at least a portion of the training image; or
a transformation that blurs at least a portion of the training image.

18. The method of claim 1, wherein training the speaker neural network using the rewards for the training images comprises:

training the speaker neural network using the rewards through reinforcement learning.

19. The method of claim 18, wherein training the speaker neural network using the rewards through reinforcement learning comprises:

training the speaker neural network using a policy gradient reinforcement learning technique.

20. The method of claim 19, wherein the policy gradient reinforcement learning technique is REINFORCE.

21. A system comprising:

one or more computers; and one or more storage devices storing instructions that, when executed by one or more computers, cause the one or more computers to perform operations comprising:

obtaining a set of one or more training images;

for each training image in the set:

processing the training image using a speaker neural network to generate a text caption for the training image;

generating a plurality of listener inputs, each listener input comprising (i) the text caption for the training image and (ii) a respective set of images, wherein the respective set of images includes a corresponding version of the training image and a corresponding set of one or more distractor images that are each different from the training image;

for each listener input, processing the listener input using a respective listener neural network from a set of one or more listener neural networks to generate a respective match score for each image in the respective set of images in the listener input; and generating a reward for the training image based at least in part on the respective match scores for the training image generated by processing each of the listener inputs; and training the speaker neural network using the rewards for the training images.

22. One or more non-transitory computer-readable storage media storing instructions that when executed by one or more computers cause the one or more computers to perform operations comprising:

obtaining a set of one or more training images;

for each training image in the set:

processing the training image using a speaker neural network to generate a text caption for the training image;

generating a plurality of listener inputs, each listener input comprising (i) the text caption for the training image and (ii) a respective set of images, wherein the respective set of images includes a corresponding version of the training image and a corresponding set of one or more distractor images that are each different from the training image;

for each listener input, processing the listener input using a respective listener neural network from a set of one or more listener neural networks to generate a respective match score for each image in the respective set of images in the listener input; and generating a reward for the training image based at least in part on the respective match scores for the training image generated by processing each of the listener inputs; and training the speaker neural network using the rewards for the training images.

\* \* \* \* \*